INVENTORS
GLENN A. MARSH
BY EDWARD SCHASCHL

ATTORNEY

Sept. 21, 1965   G. A. MARSH ETAL   3,207,981
ELECTRICAL DEVICE HAVING UNIQUELY POSITIONED ELECTRODES
FOR DETERMINING METAL LOSS FROM TUBULAR MEMBERS
Filed Nov. 21, 1960   2 Sheets-Sheet 2

INVENTORS
GLENN A. MARSH
BY EDWARD SCHASCHL

*Edward N. L...*

ATTORNEY

United States Patent Office 3,207,981
Patented Sept. 21, 1965

3,207,981
ELECTRICAL DEVICE HAVING UNIQUELY POSITIONED ELECTRODES FOR DETERMINING METAL LOSS FROM TUBULAR MEMBERS
Glenn A. Marsh and Edward Schaschl, Crystal Lake, Ill., assignors to The Pure Oil Company, Chicago, Ill., a corporation of Ohio
Filed Nov. 21, 1960, Ser. No. 70,690
2 Claims. (Cl. 324—65)

This invention is directed to a device for testing metal articles, and in particular to a device for testing tubular articles for the presence of a fracture in the wall portion thereof, or for the irregular removal of metal from the exterior surface thereof, as by corrosion. In particular, the invention is directed to an electrical apparatus insertable within the tube to be tested for making resistance measurements indicative of the presence or absence of flaws or pits in the metal.

The apparatus of the present invention, like some devices of the prior art, utilizes the change in the resistance of the wall portion of the tube to be tested upon the removal of metal from the tube exterior. This change in resistance is detected by circulating a current through the wall of the tube and determining the potential drop of electrodes spaced in electrical symmetry with respect to the points of current application.

The devices of the prior art have failed to operate in a satisfactory manner because the current electrodes used to make contact with the tube interior often fail to achieve an electrical connection of substantially zero resistance, a voltage drop occurs at the point electrode contact, and the total voltage drop occurring in the tube wall between the points of current application therefore varies widely. Such variations in potential drop have heretofore produced a corresponding variation in voltage drop across the sensing electrodes, thus producing an erroneous reading. The net effect of such errors is to indicate the existence of a flaw or pit wherein none in fact exists, or in aggravated cases, to produce such wide fluctuations in sensed potential as to obscure the presence or absence of flaws or pits in the tube.

It is an object of this inventon to provide an apparatus insertable within a tube for making accurate determinations of the tube-wall resistance and thereby determine the presence or absence of flaws or pits.

Another object of this invention is to provide a device for determining the existence of irregularities or pits in the exterior surface of a cylindrical tube by making resistivity measurements from the tube interior.

Still another object of this invention is to provide an apparatus of the class described which is not subject to erroneous readings caused by poor contact of the current-applying electrodes with the interior surface of the tube being tested.

Briefly, the apparatus of this invention comprises a sonde insertable within the tube to be tested, the sonde having a plurality of radially projecting electrodes adapted to contact the interior tube surface. The electrodes are disposed circumferentially around the sonde, two of the electrodes being adapted for the application of current to opposite points on the tube diameter. Other electrodes make contact with the tube wall between the points of current application, for the purpose of sensing the electrical potential at these electrodes. Null-type circuits are connected to the sensing electrodes to cancel the potentials sensed, and indicate only the variation therebetween.

This invention is best described with reference to the drawings, of which:

Figure 1:
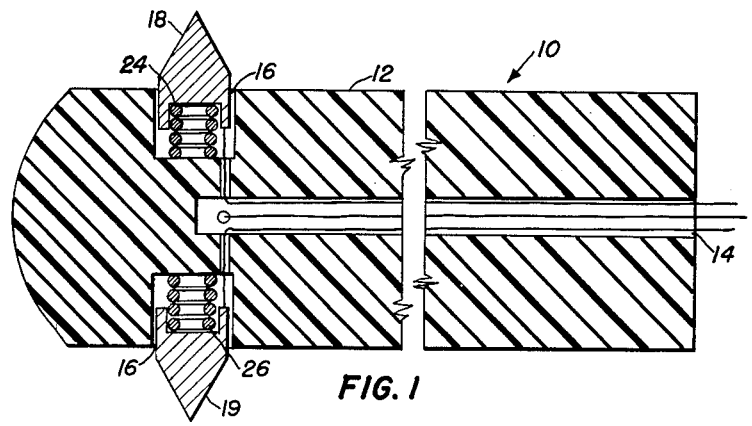
FIGURE 1 is a frontal, sectional view of the sonde of this invention.
Figures 2, 3:
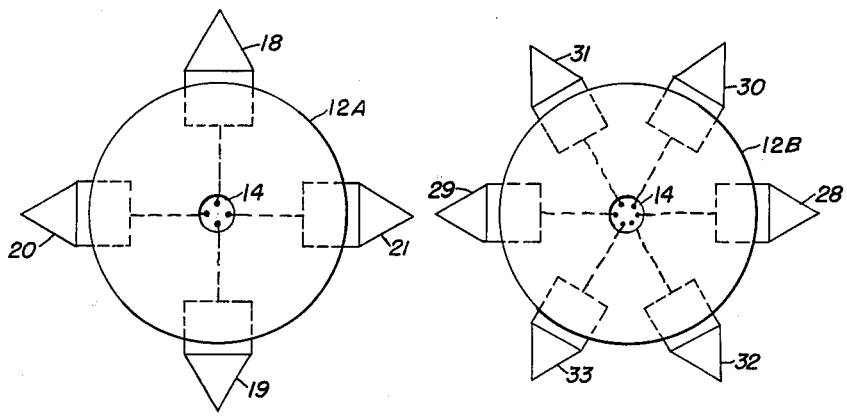
FIGURE 2 is an end view of the sonde depicted in FIGURE 1.
FIGURE 3 is a end view of an alternate sonde constructed in accordance with this invention.

Referring to FIGURES 1 and 2, sonde 10 consists of a body portion 12, which is preferably fabricated of a strong, electrically insulated material, such as Bakelite, polyethylene, or other plastic materials. The body 12 may be cylindrical, and is provided with an axial hole 14 adapted to accommodate electrical leads. Four, radially directed, equally spaced, circular holes 16 are provided in body 12, and within each hole is placed an electrode, such as cylindrical, conically pointed electrodes 18, 19, 20, and 21. Each electrode is urged outward from the body 12 by a spring, such as spring 24 or 26. An electrical conductor is secured to each electrode, and passes to axial hole 14 and thus outward from the end of sonde 10.

Referring to FIGURE 3, a similar sonde is depicted. In this case, 6 electrodes are employed, all of the electrodes again projecting radially outward under the influence of spring tension, and being disposed in a common plane, which plane is preferably perpendicular to the axis of the sonde.

Figure 4:
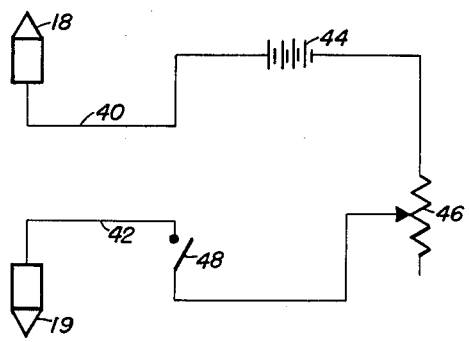
FIGURE 4 is a schematic view of an electrical circuit which may be used in conjunction with the current-applying electrodes.

Referring to FIGURE 4, the current source for supplying current to electrodes 18 and 19 comprises conductors 40 and 42 which connect electrodes 18 and 19 to battery 44, variable resistance 46, and switch 48, the battery, variable resistance, and switch being serially connected. Such a current source may be used in conjunction with the electrodes 18 and 19 of the sonde of FIGURE 2, or the electrodes 28 and 29 of the sonde of FIGURE 3.

Figure 6:
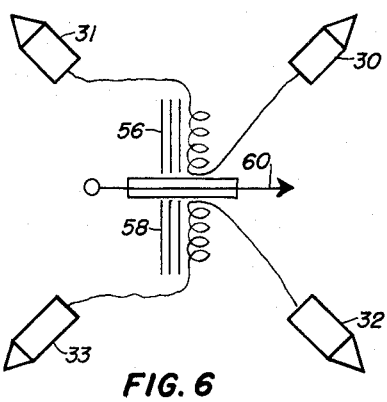
FIGURE 6 is a schematic diagram of a circuit which may be employed with the potential-sensing electrodes of the sonde depicted in FIGURE 3.
Figure 5:
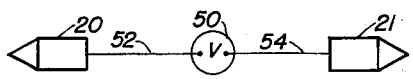
FIGURE 5 is a schematic view of a circuit which may be employed in conjunction with the potential-sensing electrodes of the sonde depicted in FIGURE 2.

The means for measuring the difference between the potentials sensed by potential-sensing electrodes 20 and 21 may simply comprise voltmeter 50 and conductors 52 and 54, as shown in FIGURE 5. The voltmeter may be of conventional type, but preferably should be of relatively high resistance. Vacuum-tube voltmeters may suitably be used. Means for measuring the difference between the potentials sensed by the electrodes of the sonde of FIGURE 3 is depicted in FIGURE 6. In this case, there are two pairs of potential-sensing electrodes, 30 and 31 forming one pair, and 32 and 33 the other. It is evident that in this case it is the potential drop between the electrodes of each pair that is sensed, and the means for measuring the difference in these sensed potential drops comprises a galvanometer having two armature coils, as is schematically represented in FIGURE 6. The two galvanometer coils, 56 and 58, are connected to the potential-sensing electrode pairs so that coils 56 and 58 act in opposition, and the pointer 60 deflects in proportion to the potential difference. It is evident that in conjunction with the sondes depicted in either FIGURE 2 or FIGURE 3, equivalent electronic circuitry for measuring the difference in the sensed potentials may be employed.

It is evident that what is measured is the difference in sensed potentials, rather than the absolute potentials themselves. Thus, when the device is inserted in a cylindrical tube of homogeneous cross-section and switch 48 is closed to apply current to the current electrodes, the meter will in this instance indicate zero deflection, because the potential sensed by each electrode, or by each electrode pair as the case may be, will be the same. Where a pit or flaw exists in the exterior surface of the tube, the potential drop in the parallel circuits provided by the tube on each side of the current electrodes, will not have the same resistance. Thus the electric potentials sensed will not be the same, and the meter will deflect in proportion to the magnitude of the resistance vagary produced by the flaw or pit. It is further evident that the occurrence of high contact-resistance between the current-applying electrodes and the tube surface will not cause the meter to deflect, because the potential sensed by the potential-sensing electrodes, or electrode pairs, will decrease proportionally, and the balance of the potential-difference-measuring circuit will not be disturbed. This feature of the invention can best be explained by reference to FIGURES 7 and 7A for the sonde depicted in FIGURE 2, and 8 and 8A for the sonde depicted in FIGURE 3.

Figure 7:
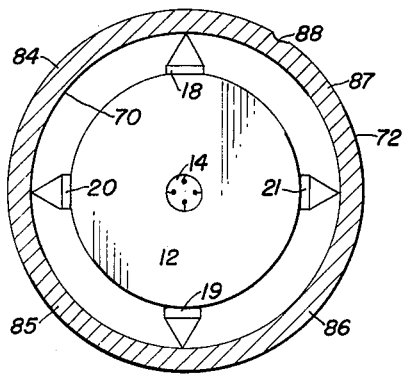
FIGURE 7 is a schematic showing of the electrode contact achieved by the sonde depicted in FIGURE 2.
Figure 7A:
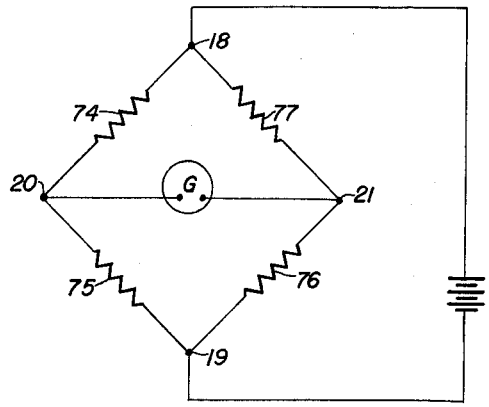
FIGURE 7A is a schematic diagram of an equivalent electrical circuit.

Referring to FIGURE 7, the electrodes 18, 19, 20, and 21 contact the interior surface 70 of tube 72 at spacings of 90° as shown. Each arc of the tube lying between adjacent electrodes has a definite resistance, and hence the circuit can be shown schematically as in FIGURE 7A, to be a conventional Wheatstone bridge circuit. The current electrodes 18 and 19 are shown in FIGURE 7A to connect to a current source, while the potential-sensing electrodes 20 and 21 connect to the meter of the Wheatstone bridge circuit. The resistances 74, 75, 76, and 77 represent the resistances of the tube arcs 84, 85, 86, and 87, respectively. It is evident that if the tube is homogeneous, that is, the resistance of each arc is identical, the bridge circuit will be balanced and the meter will not deflect. However, if a flaw, such as pit 88, exists in one arc of the tube, the resistance in this arc will be increased, and the effect is the same as an increase in the resistance in the corresponding branch of the equivalent bridge circuit. Accordingly, the galvanometer deflects in proportion to this resistance increase.

As is well known, the branches of a bridge circuit need not all be of the same value to obtain a balanced circuit. A balanced circuit is also achieved when the ratio of the resistances of two adjacent branches of the circuit equals the ratio of the resistances of the remaining two branches of the circuit. Accordingly, while it is preferred to space the electrodes 18, 19, 20, and 21 at right angles from each other, this is not essential. Other spacings may be provided so long as electrical symmetry is maintained, that is, the ratios of the resistances of the adjacent arcs of the tube satisfy the Wheatstone-bridge law. Thus, for example, the current electrodes, instead of being placed at the 12 o'clock and 6 o'clock positions, as shown in FIGURE 7, could be placed at the 2 o'clock and 6 o'clock positions, provided that the potential-sensing electrodes were moved correspondingly, that is, to the 4 o'clock and 10 o'clock positions. In this way, for a homogeneous tube, the ratio of the resistances of adjacent arcs of the tube to the ratio of the resistances of the remaining arcs of the tube would be equal, so that the bridge would be balanced. It is therefore evident that a wide variety of electrode spacings may be used, provided only that electrical symmetry is maintained. Since Wheatstone-bridge circuits exhibit their greatest accuracy when the resistance of the branches is equal, it is preferred that the electrodes be located as shown in FIGURES 2 and 7.

Figure 8:
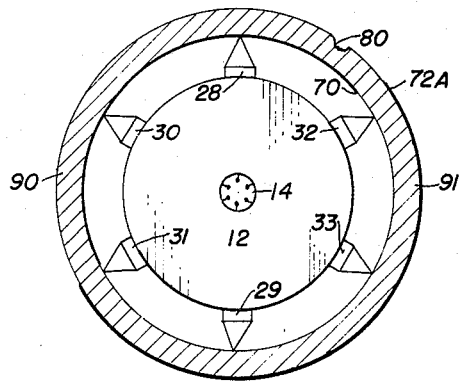
FIGURE 8 is a schematic diagram of the electrode contact obtained by the sonde depicted in FIGURE 3.
Figure 8A:
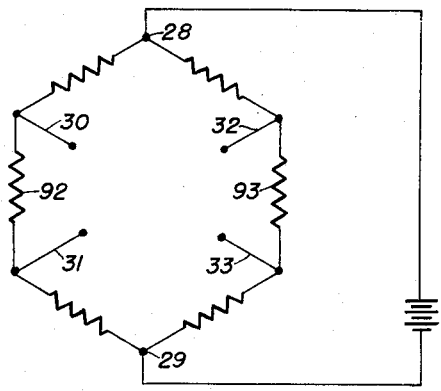
FIGURE 8A is a schematic diagram of an equivalent electrical circuit.

Referring now to FIGURE 8 and 8A, the six-electrode embodiment, and the equivalent schematic drawing of the circuit thereby provided, is depicted. It is evident that in this case what is measured is the difference in the potentials sensed between electrodes 30 and 31 of the first electrode pair, and 32 and 33 of the second electrode pair. Thus, it is the potential drop in tube arc 90 which is compared with the potential drop in tube arc 91. The resistance of tube arc 90 is represented schematically by resistance 92 of FIGURE 8A, and the resistance of tube arc 91 is represented schematically by resistance 93. It is apparent that for a homogeneous tube, if current electrodes 28 and 29 are located 180 degrees apart, the total resistance of the right- and left-hand branches of the circuit must be equal. Therefore, if the resistance values of resistances 92 and 93 are equal, the circuit will be balanced and no deflection of the meter will occur. For a homogeneous tube, the resistance values of resistances 92 and 93 may be maintained identical in practice by making the arcs 90 and 91 between the potential-sensing electrode pairs 30 and 31, and 32 and 33, identical. Thus, the arcs between the electrodes of each pair can be 10 degrees, or 30 degrees, or 60 degrees, or any other desired value, provided that the arc is the same for each pair.

If a pit, such as pit 80, exists in the exterior surface of the tube, and this pit is not located between the electrodes of either pair, the meter will nevertheless deflect since the total resistances of the right- and left-hand branches of the current circuit through the tube walls will no longer be equal, and a greater proportion of current will pass through the branch of lower resistance. If, on the other hand, the flaw exists between the electrodes of either potential-sensing pair, the meter will also deflect, though in the opposite direction, since the voltage drop between the points of potential measurement is increased by the presence of the pit.

The electrode-sensing pairs need not be spaced in any particulr angular relationship with respect to the current electrodes, since what is important is that the arc between the electrodes of each pair be the same. In this case, it is not absolute potential values which are being balanced, it is potential differences which are being compared.

While not at once apparent, it is nevertheless true that an electrode spacing having electrical symmetry may be obtained even though the electrodes 28 and 29 of FIGURE 8 are not separated by an angle of 180°. To obtain a balanced circuit possessing electrical symmetry, where the spacing of the current electrodes is other than 180°, it is necessary to change the spacing of the electrodes of one potential-sensing pair proportionally, that is, the ratio of the arc 90 to the total left-hand arc between electrodes 28 and 29 must be equal to the ratio of the arc 91 to the total right-hand arc between the electrodes 28 and 29. As an example of such a spacing, the electrodes 28 and 29 could be placed in the 2 o'clock and 6 o'clock positions, electrodes 32 and 33 placed in the 3 o'clock and 5 o'clock positions, and the electrodes 30 and 31 placed in the 12 o'clock and 8 o'clock positions. It is nevertheless preferred that an electrode spacing, as shown in FIGURES 3 and 8, wherein the angle between adjacent electrodes is 60°, be employed, because this arrangement provides greater inherent accuracy of measurement.

As has been pointed out, the occurrence of abnormal resistance between the current electrodes and the interior surface of the tube has the effect of decreasing the current in each branch of the circuit, or arc of the tube, proportionately so that there is no deflection of the meter caused by the occurrence of a high contact-resistance. The effect is merely to decrease the total current flow, and thereby decrease somewhat the sensitivity of the instrument. As the sonde is moved through a tube to check for the existence of irregularities, such high contact-resistances frequently occur, and in the devices of the prior art produced erroneous readings. This difficulty is completely avoided by the apparatus and circuits of this invention. Another advantage of the device of this invention is that it is possible in one pass through the tube to determine the presence or absence of pits in the entire tube periphery, since the entire circumference of the tube is scanned at one time.

High contact-resistance may also occur between the potential-sensing contacts and the tube wall. This, however, is not a serious problem, since in the sonde depicted in FIGURE 2 such resistances again act only to decrease the sensitivity of the instrument, but cannot produce deflection of the meter where no heterogeneity of the tube in fact exists. When the sonde of FIGURE 3 is utilized in conjunction with a circuit such as depicted in FIGURE 6, the occurrence of high contact-resistance between the potential-sensing electrode and the tube wall tends to produce an erroneous needle deflection, but the magnitude of such a deflection is very small because the resistance in the measuring circuit is high. For example, if the resistance in the measuring circuit is 1,000 ohms, a contact resistance of as much as 2 ohms at one of the potential-sensing electrodes will induce an error of only 0.2%.

It is important that both the current- and potential-sensing electrodes of either embodiment of the invention be placed in a common plane. It is preferred, but not essential, that this plane be perpendicular to the axis of the tube which is to be measured, that is, perpendicular to the axis of the sonde. By the use of appropriate circuits, the device may be made to operate using either alternating or direct current. Such design modifications will be obvious to those skilled in electronic arts. Since the resistance of the tube to be measured will be very low, it is evident that the voltage applied between the current electrodes need not be great. Voltages in the order of one or two volts will generally be satisfactory. Extremely high voltages, and the corresponding currents which they produce, are disadvantageous, not only because of the power requirements which they impose, but further because high temperatures may be generated at the zone of contact between the current electrodes and the tube interior. Such high temperatures are detrimental to electrode life.

The embodiments of the invention in which an exclusive property or privilege is claimed are defined as follows:

1. A sonde for testing hollow cylindrical tubes comprising an elongated body member insertable within a tube; two current electrodes spaced 180° apart, lying in a common plane perpendicular to the longitudinal axis of said body member and projecting radially from said body member to contact the tube interior; two potential-sensing electrodes projecting radially from said body member to contact the tube interior, each of said sensing electrodes being disposed in said common plane and being 90° part from said current electrodes and 180° apart from each other; a current source connected to said current electrodes; and means connected between said potential-sensing electrodes for measuring electric potential.

2. A sonde for testing hollow cylindrical tubes comprising an elongated body member insertable within a tube; two current electrodes spaced 180° apart, lying in a common plane perpendicular to the longitudinal axis of said body member and projecting radially from said body member to contact the tube interior; two pairs of potential-sensing electrodes projecting radially from said body member to contact the tube interior and being disposed in said common plane, each of said pairs being disposed between said current electrodes whereby an angle of 60° exists between any two adjacent electrodes; a current source connected to said current electrodes; and means connected to said potential-sensing electrodes for measuring the difference between sensed potentials.

References Cited by the Examiner
UNITED STATES PATENTS

| | | | |
|---|---|---|---|
| 2,124,577 | 7/38 | Knerr | 324—37 X |
| 2,124,578 | 7/38 | Knerr et al. | 324—64 |
| 2,200,827 | 5/40 | Atkinson | 324—64 |
| 2,400,678 | 5/46 | Archie | 324—10 |
| 2,440,044 | 4/48 | Greenslade | 324—64 |
| 2,770,773 | 11/56 | Cooley | 324—37 |

WALTER L. CARLSON, *Primary Examiner.*

SAMUEL BERNSTEIN, JAMES W. LAWRENCE, FREDERICK M. STRADER, *Examiners.*